United States Patent [19]
> Stowe

[11] 4,114,919
[45] Sep. 19, 1978

[54] TOWING APPARATUS

[76] Inventor: Alan Andrews Stowe, 5415 Winchester Ave., Ventnor, N.J. 08406

[21] Appl. No.: 860,800

[22] Filed: Dec. 15, 1977

Related U.S. Application Data

[63] Continuation of Ser. No. 786,203, Apr. 11, 1977, abandoned.

[51] Int. Cl.² .............................................. B60D 1/04
[52] U.S. Cl. ................................... 280/292; 280/402; 280/492
[58] Field of Search ............... 280/292, 204, 402, 492, 280/494, 495, 498, 499, 504

[56] References Cited

U.S. PATENT DOCUMENTS

| 718,322 | 1/1903 | Davis | 280/292 |
|---|---|---|---|
| 937,835 | 10/1909 | Mason | 280/292 |
| 1,002,507 | 9/1911 | Elson | 280/292 |
| 2,212,958 | 8/1940 | Rea | 280/492 |

FOREIGN PATENT DOCUMENTS

| 947,103 | 6/1949 | France | 280/204 |
|---|---|---|---|
| 464,351 | 4/1937 | United Kingdom | 280/204 |

*Primary Examiner*—Joseph F. Peters, Jr.
*Assistant Examiner*—Donn McGiehan
*Attorney, Agent, or Firm*—J. Rodman Steele, Jr.

[57] ABSTRACT

A towing apparatus for bicycles or the like, comprising a first member; means for attaching the first member to a towing bicycle; a hitch member attached to a towed bicycle; an intermediate member for connecting the hitch member to the first member, adapted to slideably rest on the first member; first means for pivotally and detachably connecting the first member and the intermediate member; and, second means for pivotally and detachably connecting the hitch member and the intermediate member, such that the towed bicycle is towed in an inverted position, with only its rear wheel resting on the ground and its front wheel pivoted and clamped in a rearward position.

27 Claims, 5 Drawing Figures

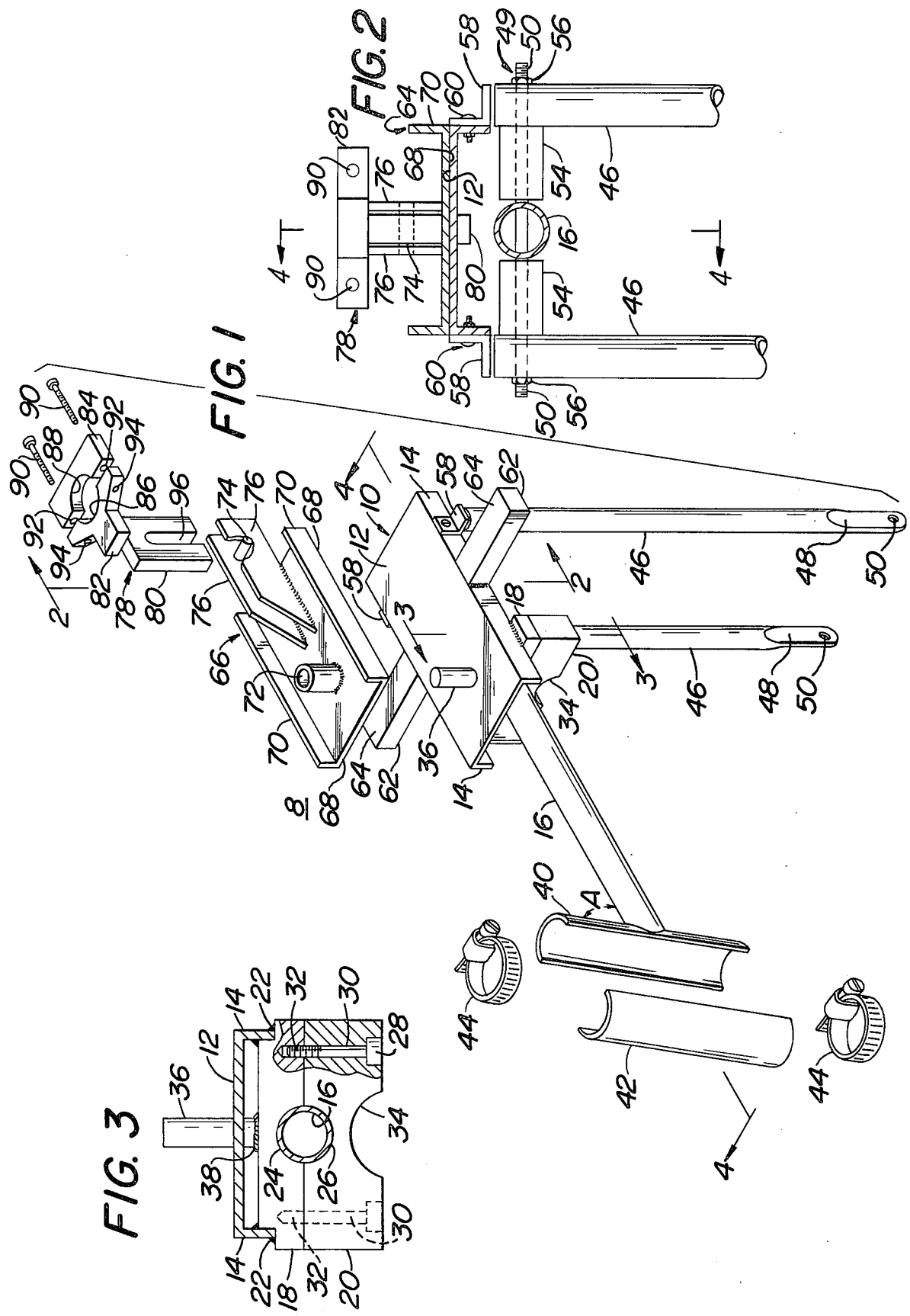

TOWING APPARATUS

CROSS-REFERENCES TO RELATED APPLICATIONS

This application is a continuation in part of application Ser. No. 786,203, filed Apr. 11, 1977, now abandoned, all of the subject matter of which is specifically incorporated herein by reference thereto.

BACKGROUND OF THE INVENTION

I. Field of the Invention

The field of this invention relates to towing apparatus, and in particular, to devices which enable one bicycle or the like to be towed by another bicycle in such manner that stability and control of the towed bicycle are maintained.

II. Description of the Prior Art

Several significant problems are presented in towing one bicycle, or the like, by another bicycle. These problems include a tendancy for the towing and towed bicycles to tip over, a tendancy for the towed bicycle to wander back and forth, rather than accurately tracking the towing bicycle, other difficulties in maneuverability and handling of the towed and towing bicycles and facilitating attachment of the towed bicycle.

In some devices known in the art, accurate tracking and maneuverability were provided by pulling the towed bicycle in an inverted position, with the towed bicycle having only its rear wheel on the ground. One device permitted the bicycle to be towed in an upright position, with only the front wheel on the ground, the front wheel being locked into a forward position. In all of these devices, however, the problem of stability was not a significant factor, since each of the towing vehicles had at least two rear wheels mounted at opposite ends of a rear axle. Under any normal operating circumstances, the towing vehicle was simply in no danger of being tipped over. Further, most of the towing vehicles, by their very nature, weighed significantly more than the towed bicycle.

By way of contrast, the present invention provides an apparatus for towing a bicycle or the like by another bicycle, that is, a vehicle which has only one rear wheel, as well as only one front wheel, and which is therefore inherently in danger of being tipped over. This is particularly true when the towing bicycle is subjected to the unfamiliar inertial forces caused by the towed bicycle.

The present invention utilizes a member attached over the rear wheel of the towing bicycle which serves as a platform. A hitch member is attached to the front stem of the towed bicycle, between the handlebars and the front wheel thereof, this being one of the strongest points on a bicycle frame. Finally, the hitch member and platform member are each pivotally and detachably connectable to one another by means of an intermediate member, which slideably rests on the platform member. The hitch member is disposed so that the towed bicycle is pulled in an inverted position, with only its rear wheel on the ground. The front wheel of the towed bicycle is placed in a fully reversed or rearward position, and clamped to the bicycle frame. This reduces the towed bicycle to the smallest overall dimension and provides additional room for the rider of the towing bicycle.

None of the devices known in the art have had to meet the problem of stability, particularly where the towing vehicle is another bicycle. The platform arrangement of the present invention provides this stability. The devices known in the art also fail to disclose an arrangement utilizing a pivotal and detachable intermediate member such as that in the present invention. None of the prior art devices, nor any combination of the prior art devices suggest the unique combination of features in the present invention, which include the use of an intermediate pivotal and detachable member mounted on a platform member, for stably towing a bicycle by another bicycle, with the towed bicycle being pulled in an inverted position, with only the rear wheel on the ground, and with the front wheel turned and clamped in its rearmost position.

The present invention, in overcoming the aforementioned problems, also serves to increase the convenience of using bicycles for more transportation needs. In a world where oil reserves are rapidly diminishing and gasoline prices are rapidly rising, any apparatus which multiplies the usefulness of bicycles represents a significant advance in energy conservation.

One of the most typical uses for an automobile is a local trip to "drop someone off" or "pick someone up." Such use is necessitated by the fact that means of transportation is either no longer needed or not available at the destination. Use of the present invention permits ordinary bicycles to be used for all such trips, in place of automobiles.

Use of the present invention can also supercede the use of automobiles, in many cases, in transporting bicycles to and from repair shops, as well as to one's home from any point of breakdown. Most automobiles are ill-suited for this use anyway, since few automobiles have large enough trunks or rear seats to safely or conveniently transport bicycles. Although bicycle racks for automobiles are becoming popular, they present vision hazards, and are not always secure at moderate speeds or on bumpy roads. Use of the present invention can reduce or eliminate the need to use automobiles for this purpose. Bicycles are less economical as means for energy conserving transportation if they must be continually transported by automobiles. The present invention also provides a significant boon to cyclists without easy access to automobiles, permitting broken bicycles, in many cases, to be towed by another bicycle, rather than being pushed or "walked."

SUMMARY OF THE INVENTION

It is an object of the present invention to provide an apparatus for easily and conveniently towing a bicycle or the like by another bicycle.

It is a further object of the present invention to provide an apparatus for conveniently towing a bicycle or the like by another bicycle, the towed bicycle being pulled in an inverted position, with only its rear wheel touching the ground.

It is a still further object of the present invention to provide an apparatus for towing a bicycle or the like by another bicycle, with the towed bicycle being pulled in an inverted position with only the rear wheel thereof touching the ground, and with the front wheel thereof pivoted and clamped in its rearmost position.

It is another object of the present invention to provide an apparatus for towing a bicycle or the like by another bicycle, wherein the towed bicycle may be easily and detachably connected to the towing bicycle.

It is yet another object of the present invention to provide an apparatus for towing a bicycle or the like by another bicycle, wherein the towed bicycle is easily and detachably connected to the towing bicycle by means of an intermediate member which is pivotally and detachably connectable to both the towed bicycle and the towing bicycle.

It is yet another object of the present invention to provide an apparatus for towing a bicycle or the like by another bicycle, wherein the apparatus has members which are attachable to the strongest points on the frames of the bicycles.

It is yet another object of the present invention to provide an apparatus for towing a two-wheeled vehicle by another two-wheeled vehicle.

It is yet a further object of the present invention to provide an apparatus for towing a bicycle or the like by a vehicle having only one rear wheel.

Briefly, the present invention comprises means for pivotally and detachably connecting a towed bicycle and a towing bicycle, the means having attachment elements for securing the means to the towed bicycle and the towing bicycle, whereby the towed bicycle is pulled in an inverted position, with the front wheel thereof pivoted and clamped in a rearward position. More particularly, the apparatus comprises a first member, means for attaching the first member to a towing bicycle, a hitch member attached to a towed bicycle, an intermediate member for connecting the hitch member to the first member, and adapted to slideably rest on the first member, first means for pivotally and detachably connecting the first member and the intermediate member, and second means for pivotally and detachably connecting the hitch member and the intermediate member, such that the towed bicycle is towed in an inverted position.

In a preferred embodiment, the present invention comprises a first platform member having a flat upper surface and a first pin extending from the upper surface, means for attaching the first platform member to the rear stem and axle of the rear wheel of the towing bicycle, a second detachable member, having means for pivotally engaging the first pin, a flat lower surface for slideably resting upon the upper surface of the first platform member and a second pin laterally disposed behind the pivotal engaging means, and a third member, having an open slot therein for detachably engaging the second pin, attached to the front stem of the towed bicycle, between the front wheel and the handlebars thereof, such that the towed bicycle is pulled in an inverted position. A clamp is also provided for securing the front wheel of the towed bicycle in a rearwardly pivoted position.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is an exploded perspective view of a towing apparatus according to the present invention, with certain portions thereof cut away;

FIG. 2 is a section view taken along the line 2—2 in FIG. 1;

FIG. 3 is a section view taken along the line 3—3 in FIG. 1, with certain portions thereof cut away;

DETAILED DESCRIPTION OF THE PREFERRED EMBODIMENT

Figure 4:
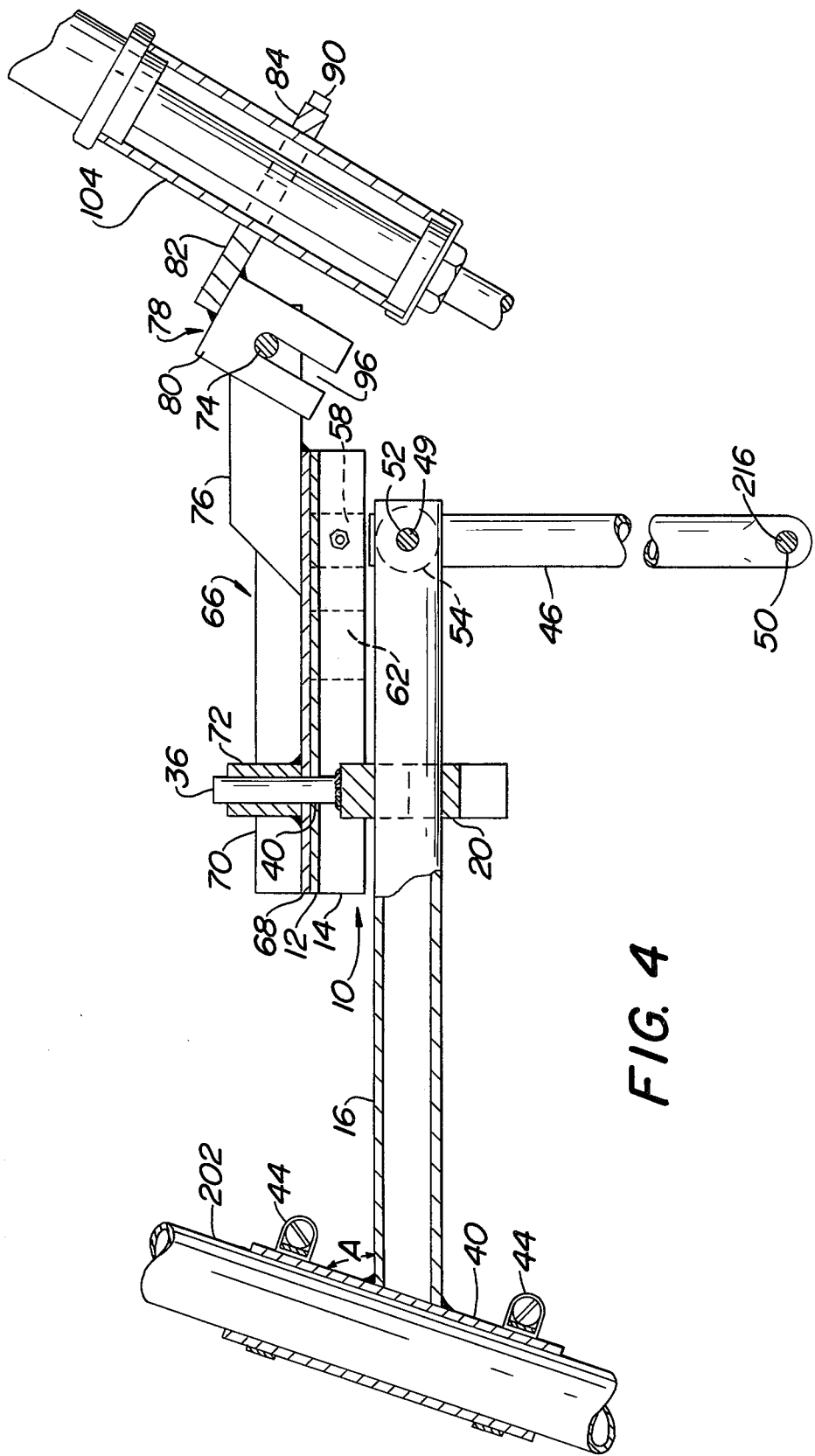
FIG. 4 is a section view taken along the line 4—4 in FIG. 1.
Figure 5:
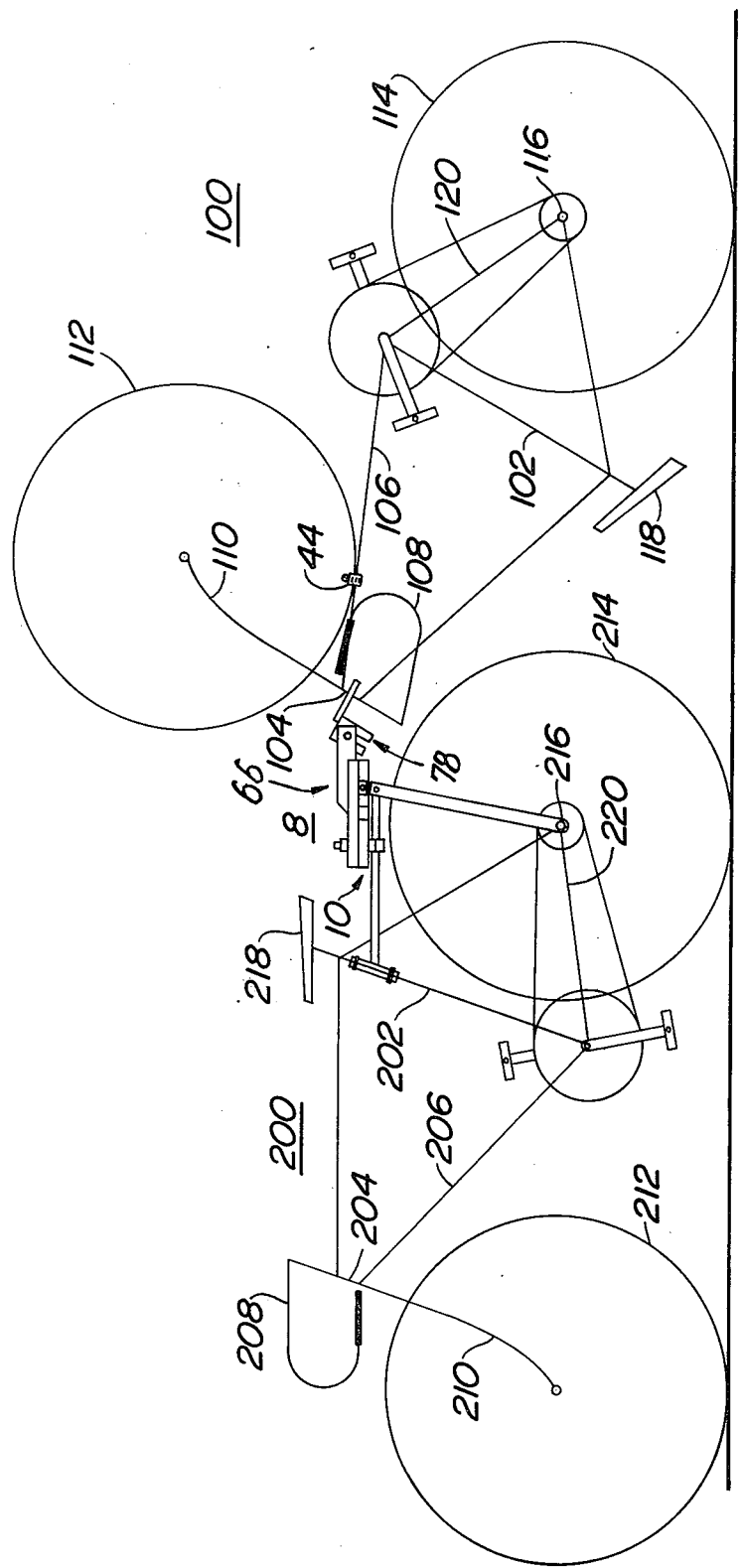
FIG. 5 is a side view in diagram form of the present invention as utilized to tow a first bicycle by a second bicycle.

A towing apparatus 8, according to the present invention is shown generally in FIG. 5 which demonstrates use of the apparatus for towing a first bicycle 100 by a second bicycle 200. The presently preferred embodiment of the towing apparatus is shown more particularly in FIGS. 1–4, wherein like numerals indicate like elements. With reference to FIG. 1, the towing apparatus 8 has three principle components, a platform member generally designated 10, an intermediate or swivel member generally designated 66, and a hitch or notched member generally designated 78.

The platform member 10 is attached to a towing bicycle, over the rear wheel 214 thereof, as illustrated in FIG. 5. The platform member 10 has a flat upper surface 12 and two downwardly extending side members 14. The platform member 10 rests on a tubular main stem 16, and is attached thereto by means of upper stem support 18 and lower stem support 20. As shown more particularly in FIG. 3, upper stem support 18 is permanently fitted into the inside and lower surfaces of side members 14. It may be attached by welding at the points shown by numerals 22. The upper and lower stem supports 18 and 20 have corresponding semi-circular notches 24 and 26 respectively, into which the main stem 16 may be fitted. The lower stem support can be secured to the upper stem support by bolts 28, one of which is shown, inserted through counter-sunk bores 30 and secured into threaded holes 32. A second semi-circular notch 34 is provided in the lower stem support 20, in order to accommodate a rear fender (not shown) on the towing bicycle 200. Pin 36 is welded around its base to the upper stem support 18 as indicated at 38, and passes through hole 40, shown in FIG. 4, in the flat upper surface 12, which provides additional support for pin 36.

With reference once again to FIG. 1, the main stem 16 has a semi-cylindrical stem clamp half 40 secured thereto. It is secured at an angle A which permits the stem clamp half to engage the rear stem 202 of the towing bicycle 200, above the rear wheel 214 and below the seat 218, as shown in FIG. 5. A corresponding semi-cylindrical stem clamp half 42 is placed on the opposite side of the rear stem 202 at the towing bicycle 200, and the stem clamp halves 40 and 42 are secured by any suitable clamping means, such as hose clamps 44.

The platform member 10 is also supported by tubular vertical braces 46. Vertical braces 46 each have flat end portions 48 and holes 50 in the flat portions. The holes 50 provide means for securing the vertical braces to the normally threaded axle 216 of the rear wheel 214 of the towing bicycle 200. Alternatively, means could be provided for securing the lower ends of the vertical braces to frame members 220.

The particular means for mounting the vertical braces 46 in the presently preferred embodiment is shown more fully in FIG. 2. A rod generally designated 49, having threaded ends 50, is mounted laterally or transversely through holes 52 in main stem 16, as shown in FIG. 4. Spacers 54 are slipped over each end of the rod 49 and then vertical braces 46 are slipped onto the rod after spacers 54. The vertical braces are secured onto rod 49 by means of nuts 56. It will be apparent to those skilled in the art that other means are available for mounting the vertical braces to the platform member, and the present invention is not limited to the precise elements and instrumentalities shown herein.

With reference to both FIGS. 1 and 2, the open upper ends of the vertical braces 46 are essentially covered by L-shaped brackets 58, which are secured to the sides 14 of platform member 10 by attachment means generally designated by numeral 60, in this presently preferred embodiment, nuts and bolts.

In order to provide additional support and stability for the intermediate member 66, platform member 10 is also provided with lateral or transverse extension members 62. The upper surfaces 64 of members 62 are aligned with flat upper surface 12. The transverse extension members can be attached by welding, as shown in FIG. 1.

The intermediate or swivel member 66 has a flat lower surface 68 and upwardly extending sides 70. Cylindrical pin engaging means 72, extending through intermediate member 66, is provided for engaging the extending pin 36. A lateral or transverse pin 74 is mounted between rearwardly extending support members 76 (one of which is shown partially cut away in FIG. 1). Pin 74 may be a dowel-like element mounted in corresponding holes in the extending support members, as indicated herein, or may be a bolt with a smooth shaft and threaded end, engageable by a nut, or any other suitable means. It can be appreciated that when intermediate member 66 is placed on platform member 10, with extending pin 36 fitted inside of cylindrical pin engaging means 72, intermediate member 66 is free to slideably rest on platform member 10, being pivoted about extending pin 36. In order to achieve optimum performance in having the towed bicycle 100 easily track the towing bicycle 200, the pivot means formed by extending pin 36 and corresponding cylindrical pin engaging means 72 is preferably positioned above or in front of the axle 216 of the rear wheel 214 of the towing bicycle 200. In this regard, it may be desirable to attach stem clamp half 40 to main stem 16 by a pivotal attachment means, which would effectively make angle A adjustable to a large degree. This would be beneficial not only in positioning the apparatus, but in permitting its use with varied bicycle structures.

Hitch or notched member 78 comprises tongue member 80 and hitch clamp halves 82 and 84. Tongue member 80 and hitch clamp half 82 are preferably welded together. Hitch clamp halves 82 and 84 are provided with semi-circular notches 86 and 88 respectively, for engaging the front stem 104 of a towed bicycle 100, being clamped thereto above the front wheel 112 and below the handlebars 108. Hitch member 78 may be secured by bolts 90, fitted through bores 92 and secured into threaded holes 94 on hitch clamp half 82. Tongue member 80 is provided with an open-ended or slot notch 96 for engaging lateral pin 74. Hitch member 78 is secured to the towed bicycle 100 such that the open end of open-ended or slot notch 96 is directed towards the handlebars 108, and away from the front wheel 112. This will assure that the towed bicycle 100 will be disposed in an inverted position when towed.

When the apparatus is used as shown in FIG. 4 and a FIG. 5, the platform member 10 is attached to a towing bicycle 200, by means shown hereinbefore, and the hitch member 78 is secured to a towed bicycle 100, also by means shown hereinbefore. After the platform member 10 and the hitch or notched member 78 have been attached to the respective bicycles, intermediate or swivel member 66 is slipped over extending pin 36 to rest on platform member 10, with lateral pin 74 being disposed behind extending pin 36, as reckoned from the front and rear of the towing bicycle. The front wheel 112 of the towed bicycle 100 is pivoted to its rearmost position, and secured in that position by any suitable clamping means, such as another hose clamp 44. This reduces the overall dimensions of the towed bicycle to a minimum. The towed bicycle is then inverted, and the tongue member 80 is slipped between support members 76, with open-ended slot 96 engaging the lateral or transverse pin 74. It can be appreciated that the pivot means provided by pin 36 and cylindrical pin engaging means 72 permits the towed bicycle to track the towing bicycle in all manner of turns. It can also be appreciated that the pivot means provided by lateral or transverse pin 74 and open-ended slot 96 permits the towed bicycle to track the towing bicycle up and down hills and over bumps and through ruts. The weight of the towed bicycle is sufficient, under all normal operating conditions, to maintain the otherwise detachable engagement of the two pivot means. The lateral or transverse extension members 62 provide additional support for intermediate member 66 and extending support members 76 provide additional support for hitch member 78, thereby increasing the stability of the whole towing system.

The apparatus according to the present invention may be comprised of aluminum, steel, and plastic, or any combination thereof, depending only upon the strength requirements of a particular element in the apparatus. It will be appreciated by those skilled in the art that alternative means are available for attaching the vertical braces to the frame members supporting the rear wheel, and for providing the two pivotal means. For instance, intermediate member 66 could be provided with a downwardly extending pin, which engages a hole in flat upper surface 12. Similarly, tongue member 80 could be provided with a pin extending laterally on either side thereof, which pin engages upwardly opening slots in support members 76. It will also be appreciated by those skilled in the art that many attachment means which are shown as welded can be adapted for attachment by nuts and bolts, rivets, screws or the like, and that many of the attachment means shown as nuts and bolts can be welded, riveted or the like.

Further, although tubular elements are conveniently utilized for relative strength and light weight, for main stem 16 and vertical braces 46, these elements need not necessarily be tubular. In addition, the L-brackets 58, for example, might be conveniently replaced by plastic caps adapted to be snapped into the upper openings of the tubular braces, and spacers 54 might be plastic as well.

In view of the foregoing, the present invention may be embodied in other specific forms without departing from the spirit or essential attributes thereof and, accordingly, reference should be made to the appended claims, rather than to the foregoing specification as indicating the scope of the invention.

I claim:

1. A device for towing a first vehicle having at least two wheels by a second vehicle having only one rear wheel, said first vehicle having a frame stem for mounting one of said at least two wheels, said second vehicle having a frame, said rear wheel having an axle by which said rear wheel is attached to said frame of said second vehicle, comprising:

a platform member on said second vehicle, disposed over said rear wheel and attached to said axle and said frame;

a hitch member attached to said frame stem of said first vehicle, disposed above said one of said at least two wheels;

an intermediate member for connecting said hitch member to said platform member, adapted to slideably rest on said platform member;

first means for pivotally and detachably connecting said platform member and said intermediate member; and, second means for pivotally and detachably connecting said hitch member and said intermediate member, such that said hitch member is disposed below said one of said at least two wheels, thereby causing said first vehicle to be towed in an inverted position.

2. The towing device of claim 1 wherein said one of said at least two wheels is pivotally mounted, and wherein said towing device further comprises clamping means for securing said pivotally mounted wheel in a rearward position.

3. The towing device of claim 1, wherein said first pivotal means comprises an extending pin means on one of said platform member and said intermediate member and corresponding socket means on the other of said platfrom member and said intermediate member.

4. The towing device of claim 3, wherein said first pivotal means is disposed above said rear wheel axle.

5. The towing device of claim 1, wherein said second pivotal means comprises two spaced, rearwardly extending support members on said intermediate member, transverse pin means supported between said rearwardly extending support members, and said hitch member having an open-ended slot means therein for engaging said transverse pin means, the opening of said open-ended slot means directed away from said one of said at least two wheels.

6. The towing device of claim 1, wherein said platform member has a flat upper surface and said intermediate member has a flat lower surface.

7. The towing device of claim 1, wherein said platform member further comprises lateral extension members for providing additional support for said intermediate member, when said intermediate member is caused to pivot about said first pivotal means.

8. A towing apparatus for bicycles or the like, comprising:
   a first member having a flat upper surface and a first pin extending from said upper surface;
   means for attaching said first member to a towing bicycle;
   a second detachable member, having a means for pivotally engaging said first pin, a flat lower surface for slideably resting upon said upper surface and a second pin laterally disposed behind said pivotal engaging means; and,
   a third member, having an open slot therein for detachably engaging said second pin, attached to a towed bicycle such that said towed bicycle is towed in an inverted position.

9. The towing apparatus of claim 8, wherein said second member has two spaced rearwardly extending support members, said second pin being mounted therebetween.

10. The towing apparatus of claim 8, wherein said towing bicycle has a frame and a rear wheel, said rear wheel having an axle by which said rear wheel is attached to said frame, said first pin being disposed above said rear wheel axle.

11. The towing apparatus of claim 8, wherein said towed bicycle has a frame having a front stem, a fork and handlebars pivotally mounted in the front stem, and a front wheel mounted in the fork, said third member being attached to said front stem, between said fork and said handlebars, the opening of said open slot being directed away from said front wheel.

12. The towing apparatus of claim 8, further comprising a clamping means for securing said front wheel in a rearmost position.

13. A towing apparatus by bicycles or the like, said bicycles each having a frame with front and rear stems, a fork and handlebars pivotally mounted in the front stem, a front wheel mounted in the fork, and a rear wheel having an axle mounted on the frame behind the rear stem, comprising:
   a platform member secured to the rear stem and rear wheel axle of a towing bicycle, said platform member having an extending pin;
   a swivel member, detachably and pivotally mounted about said extending pin on said platform member, said swivel member having a transversely mounted pin behind said extending pin; and,
   a notched member secured to the front stem of a towed bicycle, between the fork and the handlebars, said notched member having a notch opening towards said handlebars for detachably engaging said transverse pin of said swivel member, such that said towed bicycle is inverted when towed, resting only on its rear wheel and said transverse pin.

14. The towing apparatus of claim 13, wherein said extending pin is disposed above said rear wheel axle of said towing bicycle.

15. The towing apparatus of claim 13, wherein said platform member further comprises transversely extending support members for stablizing said swivel member, when said swivel member is caused to pivot about said extending pin.

16. The towing apparatus of claim 13, wherein the front wheel of the towed bicycle is pivoted to its rearmost position, and a clamp is provided for securing said front wheel to said frame, between said front and rear stems.

17. A towing apparatus for bicycles or the like comprising:
   a first member;
   means for attaching said first member to a towing bicycle;
   a hitch member attached to a towed bicycle;
   an intermediate member for connecting said hitch member to said first member, adapted to slideably rest on said first member;
   first means for pivotally and detachably connecting said first member and said intermediate member; and,
   second means, disposed rearwardly of said first pivotal means, for pivotally and detachably connecting said hitch member and said intermediate member, such that said towed bicycle is towed in an inverted position.

18. The towing apparatus of claim 17, wherein said first member further comprises lateral extension members for providing additional support for said intermediate member, when said intermediate member is caused to pivot about said first pivotal means.

19. The towing apparatus of claim 17, wherein said first pivotal means comprises an extending pin means on one of said first member and said intermediate member and corresponding socket means on the other of said first member and said intermediate member.

20. The towing apparatus of claim 17, wherein said second pivotal means comprises two spaced, rearwardly extending support members on said intermediate member, transverse pin means supported between said rearwardly extending support members, and said hitch member having an open-ended slot means therein for engaging said transverse pin means, the opening of said open-ended slot means disposed in such a way that said hitch member rests on said transverse pin means, between said rearwardly extending support members.

21. The towing apparatus of claim 17, wherein said towed bicycle has a pivotally mounted front wheel, and wherein said towing apparatus further comprises clamping means for securing said front wheel in a rearward position.

22. A towing apparatus for pulling a two-wheeled towed bicycle by a two-wheeled towing bicycle, comprising:
  means for pivotally and detachably connecting said towed bicycle and said towing bicycle, said means having attachment elements for securing said means to said towed bicycle and said towing bicycle;
  said attachment elements comprising three members, one secured to said towing bicycle, one secured to said towed bicycle and one detachably connected to the other two of said three members; and,
  said detachable connecting means further comprising:
    first means for pivotally and detachably connecting said member secured to said towing bicycle and said member detachably connected to the other two of said three members; and,
    second means, disposed rearwardly of said first pivotal means, for pivotally and detachably connecting said member secured to said towed bicycle and said member detachably connected to the other two of said three members;
  whereby said towed bicycle is pulled in an inverted position with the front wheel thereof pivoted in a rearward position.

23. The towing apparatus of claim 22, wherein said member secured to said towing bicycle is disposed over the rear wheel of said towing bicycle and wherein said member secured to said towed bicycle is disposed over the front wheel of said towed bicycle.

24. The towing apparatus of claim 23, wherein said member secured to said towing bicycle has a flat upper surface and wherein said member connecting said other two of said three members is adapted to slideably rest on said flat surface.

25. The towing apparatus of claim 22, further comprising a means for clamping said front wheel of said towed bicycle in said rearward position.

26. The towing apparatus of claim 22, wherein said first pivotal means comprises a vertical pin means and corresponding socket means.

27. The towing apparatus of claim 22, wherein said second pivotal means comprises transverse pin means and corresponding open-ended slotted means.

* * * * *